(12) United States Patent
Gallegos-Lopez et al.

(10) Patent No.: US 7,872,441 B2
(45) Date of Patent: Jan. 18, 2011

(54) SYSTEMS AND METHODS FOR OPERATING Z-SOURCE INVERTER INDUCTORS IN A CONTINUOUS CURRENT MODE

(75) Inventors: Gabriel Gallegos-Lopez, Torrance, CA (US); Lateef A. Kajouke, San Pedro, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 756 days.

(21) Appl. No.: 11/771,719

(22) Filed: Jun. 29, 2007

(65) Prior Publication Data

US 2009/0001923 A1 Jan. 1, 2009

(51) Int. Cl.
*H02P 27/04* (2006.01)
(52) U.S. Cl. .................. 318/801; 318/727; 318/767; 318/798; 318/799; 318/800
(58) Field of Classification Search .......... 318/727, 318/767, 798, 799, 800, 801
See application file for complete search history.

(56) References Cited

U.S. PATENT DOCUMENTS

| 6,876,169 | B2* | 4/2005 | Gallegos-Lopez et al. .. | 318/701 |
|---|---|---|---|---|
| 7,486,043 | B2* | 2/2009 | Atarashi ................ | 318/494 |
| 7,622,877 | B2* | 11/2009 | Schulz et al. ............ | 318/432 |
| 2002/0060549 | A1* | 5/2002 | Tobari et al. ............. | 318/727 |
| 2004/0135533 | A1* | 7/2004 | Harakawa et al. .......... | 318/609 |
| 2005/0046370 | A1* | 3/2005 | Gallegos-Lopez et al. .. | 318/434 |
| 2005/0104552 | A1* | 5/2005 | Arai et al. ............... | 318/801 |
| 2005/0253540 | A1* | 11/2005 | Kobayashi et al. ......... | 318/254 |

OTHER PUBLICATIONS

Xinping, D., et al. "A High Performance Z-Source Inverter Operating with Small Inductor at Wide-Range Load," IEEE Twenty Second Annual Applied Power Electronics Conference, APEC, Feb./Mar. 2007, pp. 615-620.

* cited by examiner

*Primary Examiner*—Walter Benson
*Assistant Examiner*—Kawing Chan
(74) *Attorney, Agent, or Firm*—Ingrassia Fisher & Lorenz, P.C.

(57) ABSTRACT

Systems, apparatus, and methods for operating inductors in a Z-source inverter in a continuous current mode are provided. One system includes an AC motor, a Z-source inverter, and a processor. The inverter is configured to provide current and reactive power to the AC motor. The processor is configured to monitor the current and instruct the inverter to provide a greater amount of reactive power to the AC motor if the current is below/equal to a threshold amount. An apparatus includes means for determining if current produced by the inverter is below/equal to a threshold amount, and means for altering voltage commands supplied to the inverter so that an AC motor is induced to draw additional reactive power. One method includes determining if a plurality of inductors are providing a threshold current amount, and inducing a motor to draw more reactive power if the current is below/equal to the threshold amount.

19 Claims, 7 Drawing Sheets

SYSTEMS AND METHODS FOR OPERATING Z-SOURCE INVERTER INDUCTORS IN A CONTINUOUS CURRENT MODE

TECHNICAL FIELD

The present invention generally relates to inverters, and more particularly relates to systems and methods for operating inductors in a Z-source inverter in a continuous current mode.

BACKGROUND OF THE INVENTION

Figure 1:
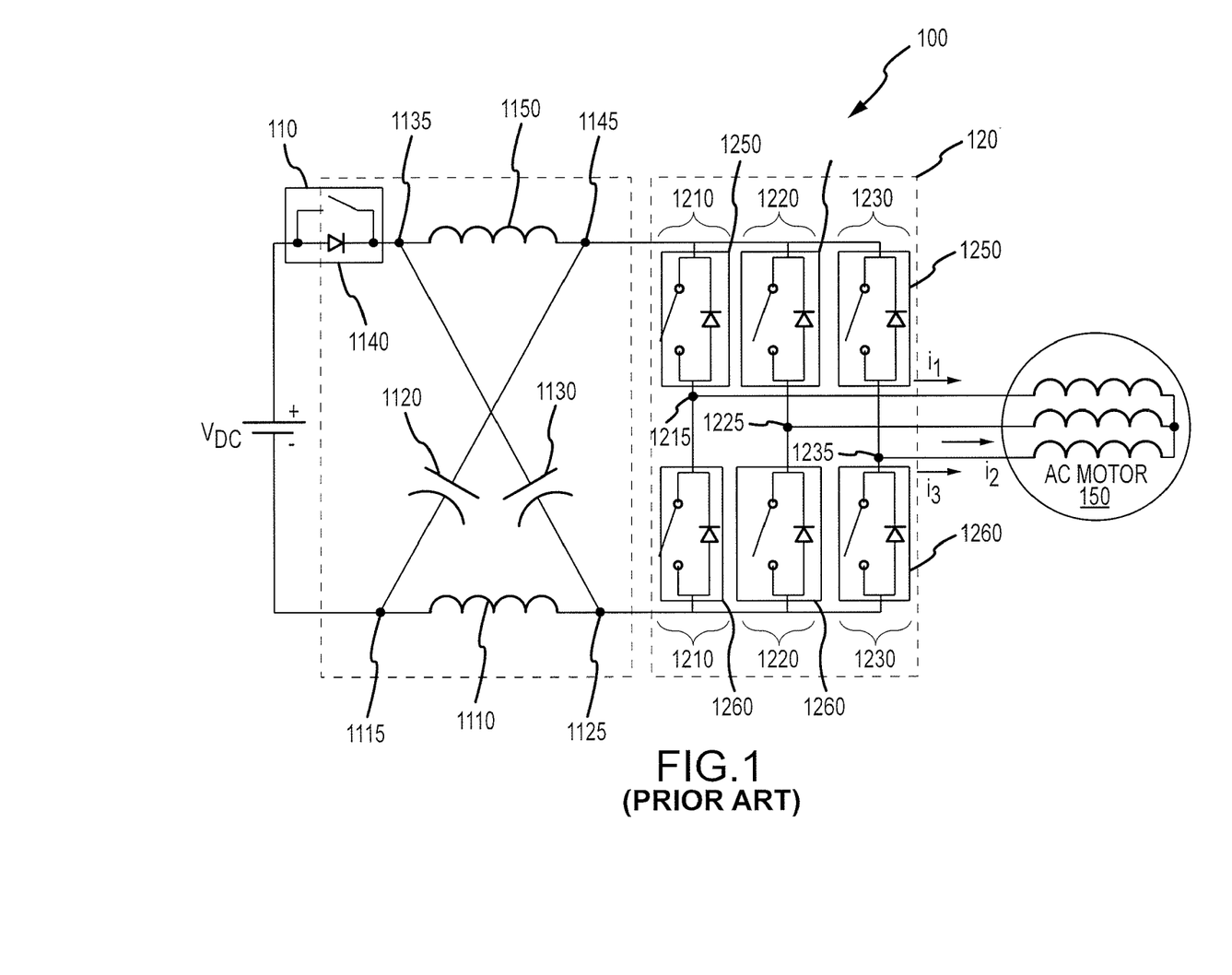
FIG. 1 is a schematic diagram of a prior art Z-source inverter coupled to an AC motor.

FIG. 1 is a schematic diagram of a conventional Z-source inverter 100 including a Z-impedance portion 110 and a three-phase inverter portion 120 coupled to an alternating current (AC) motor 150. Z-impedance portion 110 comprises an inductor 1110 having an output coupled to the negative terminal of a voltage source ($V_{DC}$) and a negative terminal of a capacitor 1120 via a node 1115. The input of inductor 1110 is coupled to a negative terminal of a capacitor 1130 and inverter portion 120 via a node 1125 known as a negative DC-link.

Z-impedance portion 110 also includes a power switch 1140 coupled to the positive terminal of $V_{DC}$ and coupled to the input of an inductor 1150 and a positive terminal of capacitor 1130 via a node 1135. The output of inverter 1150 is coupled to the positive terminal of capacitor 1120 and inverter portion 120 via a node 1145 known as a positive DC-link.

Inverter portion 120 includes three branches 1210, 1220, and 1230 coupled to AC motor 150 via nodes 1215, 1225, and 1235, respectively. Each of branches 1210, 1220, and 1230 comprise an upper power switch 1250 coupled in series to a lower power switch 1260 via a respective one of nodes 1215, 1225, and 1235. Each power switch 1250, 1260 includes a diode coupled in parallel with a switch and is capable of conducting current in two directions, and is also capable of stopping voltage in one direction.

Power switches 1250, 1260 control the flow of current within a portion of each respective branch of branches 1210, 1220, and 1230. Power switches 1250, 1260 are typically software controlled switches utilizing high frequency pulse width modulation (PWM) techniques.

During operation, one power switch 1250, 1260 in each of branches 1210, 1220, and 1230 is open and the other power switch 1250, 1260 is closed. In this configuration, closing a power switch 1250, 1260 allows current to flow within a portion of the branch, whereas opening the power switch 1250, 1260 prevents current from flowing within that portion. For example, closing the upper power switch 1250 (and opening lower power switch 1260) of branch 1210 allows current to flow from $V_{DC}$ to terminal $I_1$ via the positive DC-link (i.e., node 1145).

A high frequency PWM technique is typically utilized to control the magnitude, phase angle, and the frequency of power output to AC motor 150. That is, while power switches 1250, 1260 are controlled to operate at a substantially constant switching frequency, the switch duty cycles are modulated to produce three-phase voltages of desired magnitude, phase, and frequency.

AC motor 150 includes three terminals (e.g., terminals $I_1$-$I_3$) coupled to inverter portion 120. Terminal $I_1$ is coupled to node 1215, terminal $I_2$ is coupled to node 1225, and terminal $I_3$ is coupled to node 1235. AC motor 150 is energized with power supplied from inverter 100 and produces a mechanical output based on the supplied power.

When high amounts of power (e.g., current greater than the critical current of inductors 1110 and 1150) are supplied to AC motor 150, Z-source inverter 100 functions in a continuous mode. However, when Z-source inverter 100 is supplying low amounts of power or zero power (e.g., current less than the critical current of inductors 1110 and 1150) to AC motor 150, the voltage stored in capacitors 1120 and 1130 gradually increases because the DC-link current is less than the critical current of inductors 1110, 1150, which results in Z-source inverter 100 operating in a discontinuous mode. Should the voltage stored in capacitors 1120 and 1130 exceed the DC-link voltage rating of Z-source inverter 100, Z-source inverter 100 may become damaged.

One method to prevent capacitors 1120 and 1130 from exceeding the DC-link voltage rating of Z-source inverter 100 is to design Z-source inverter 100 to operate in a continuous mode from minimum to maximum loads by increasing the size of inductors 1110 and 1150. Although this effectively prevents capacitors 1120 and 1130 from exceeding the DC-link voltage rating of Z-source inverter 100, larger inductors increase the size and the cost associated with manufacturing Z-source inverter 100.

Accordingly, it is desirable to provide systems and methods for operating inductors in a Z-source inverter in a continuous current mode to control the voltage at the positive DC-link so that the capacitors do not store excessive amounts of voltage. It is also desirable to provide systems and methods for preventing capacitors in a Z-source inverter from storing excessive amounts of voltage without increasing the size and/or cost of manufacturing the Z-source inverter. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Various embodiments of the invention provide systems, methods, and apparatus for operating inductors in a Z-source inverter in a continuous current mode. One system comprises an alternating current (AC) motor and an inverter coupled to the AC motor. The inverter is configured to provide current and a first amount of reactive power to the AC motor.

The system also comprises a processor coupled to the AC motor and the inverter. The processor is configured to monitor the current and instruct the inverter to provide a second amount of reactive power greater than the first amount to the AC motor if the current is below a threshold current amount.

A method comprises the step of determining if a plurality of inductors are providing current to an inverter at or below a threshold current amount. Furthermore, the method comprises the step of inducing an AC motor to draw more reactive power if the plurality of inductors are providing current at or below the threshold current amount.

One apparatus comprises means for determining if a current produced by a plurality of inverter inductors is at or below a threshold current amount. The apparatus also comprises means for altering a first current component in the d-axis ($I_d$) and a first current component in the q-axis ($I_q$) of synchronous currents to form altered synchronous currents provided to the inverter to cause the inverter to provide more reactive power to an AC motor.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 2:
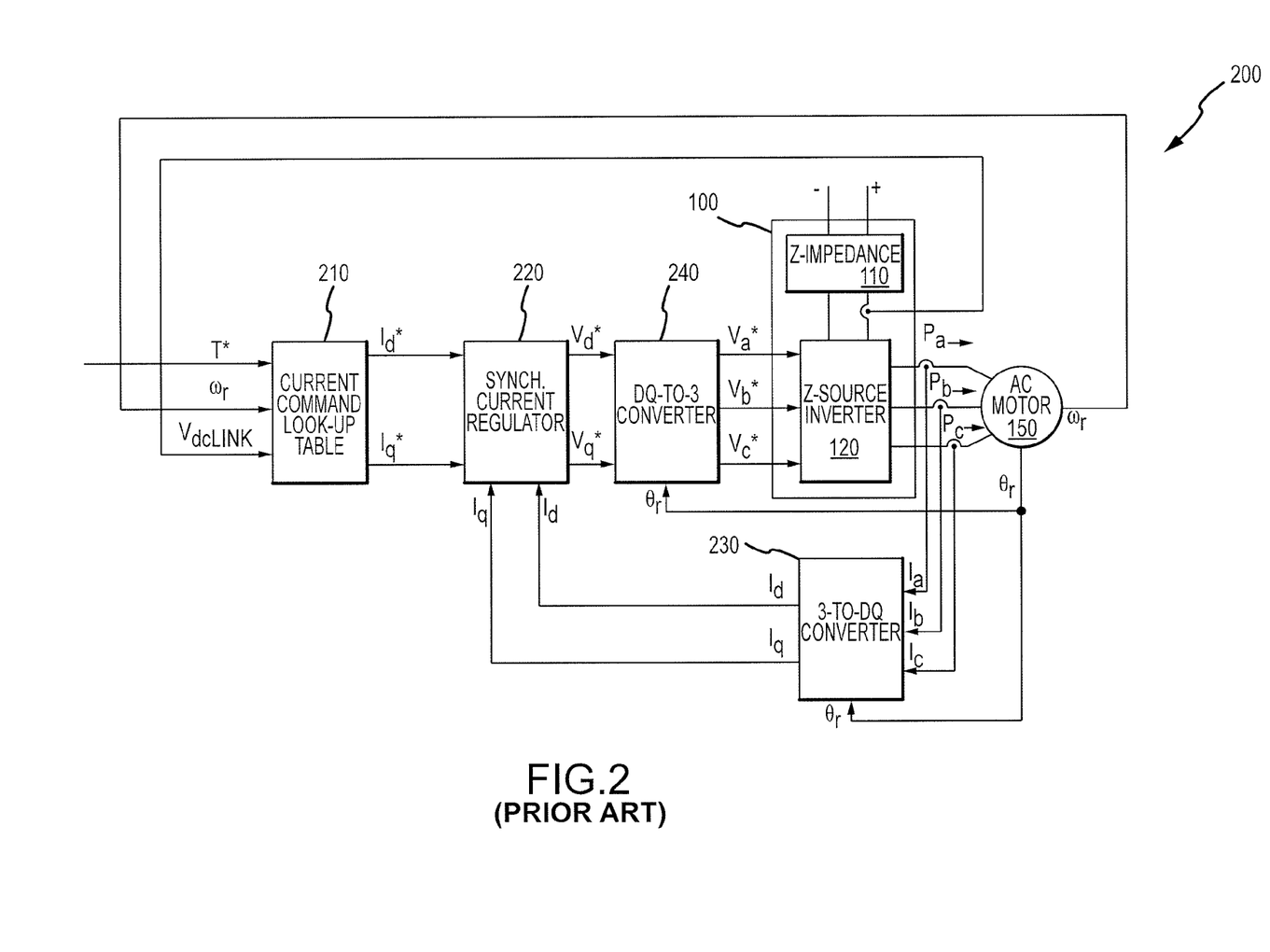
FIG. 2 is a diagram of a control system for the Z-source inverter and AC motor of FIG. 1.

FIG. 2 is a diagram of a control system 200 of Z-source inverter 100 and AC motor 150. Inverter portion 120 is supplied current from Z-impedance portion 110 and three voltage controls $V_a^*$, $V_b^*$, and $V_c^*$ for branches 1210, 1220, and 1230, respectively. Upon receipt of voltage controls $V_a$, $V_b$, and $V_c$, inverter portion 120 supplies power $P_a$, $P_b$, and $P_c$ to AC motor 150 for operation, and draws the current from Z-impedance portion 110.

To determine voltage controls $V_a^*$, $V_b^*$, and $V_c^*$, a torque command (T*) from an external processor (not shown), the motor speed ($\omega_r$) of AC motor 150, and the voltage ($V_{DClink}$) at the positive DC-link (i.e., node 1145) are fed to a current command look-up table 210, and the phase angle ($\theta_r$) of AC motor 150 is supplied to a 3-phase stationary frame-to-D-Q synchronous frame (3-to-DQ) converter 230 and a D-Q synchronous frame-to-3-phase stationary frame (DQ-to-3) converter 240. Current command look-up table 210 converts torque command T* into a q-axis current command ($I_q^*$) and a d-axis current command ($I_d^*$), which are then supplied to a synchronous current regulator 220.

Synchronous current regulator 220 also receives feedback currents $I_q$ and $I_d$ in addition to synchronous current commands having q-axis current component ($I_q^*$) and d-axis current component ($I_d^*$) from 3-to-DQ converter 230. Current regulator 220 provides the voltage command in the d-axis ($V_d^*$), and the voltage command in the q-axis ($V_q^*$), which are then supplied to DQ-to-3 converter 240.

DQ-to-3 converter 240 also receives a phase angle ($\theta_r$) of AC motor 150 and converts the two phase voltage command $V_q^*$ and voltage command $V_d^*$ in the synchronous frame into three phase voltage commands ($V_a^*$, $V_b^*$, and $V_c^*$) in the stationary frame. Voltage commands $V_a^*$, $V_b^*$, and $V_c^*$ are then supplied to branches 1210, 1220, and 1230, respectively.

Figure 3:
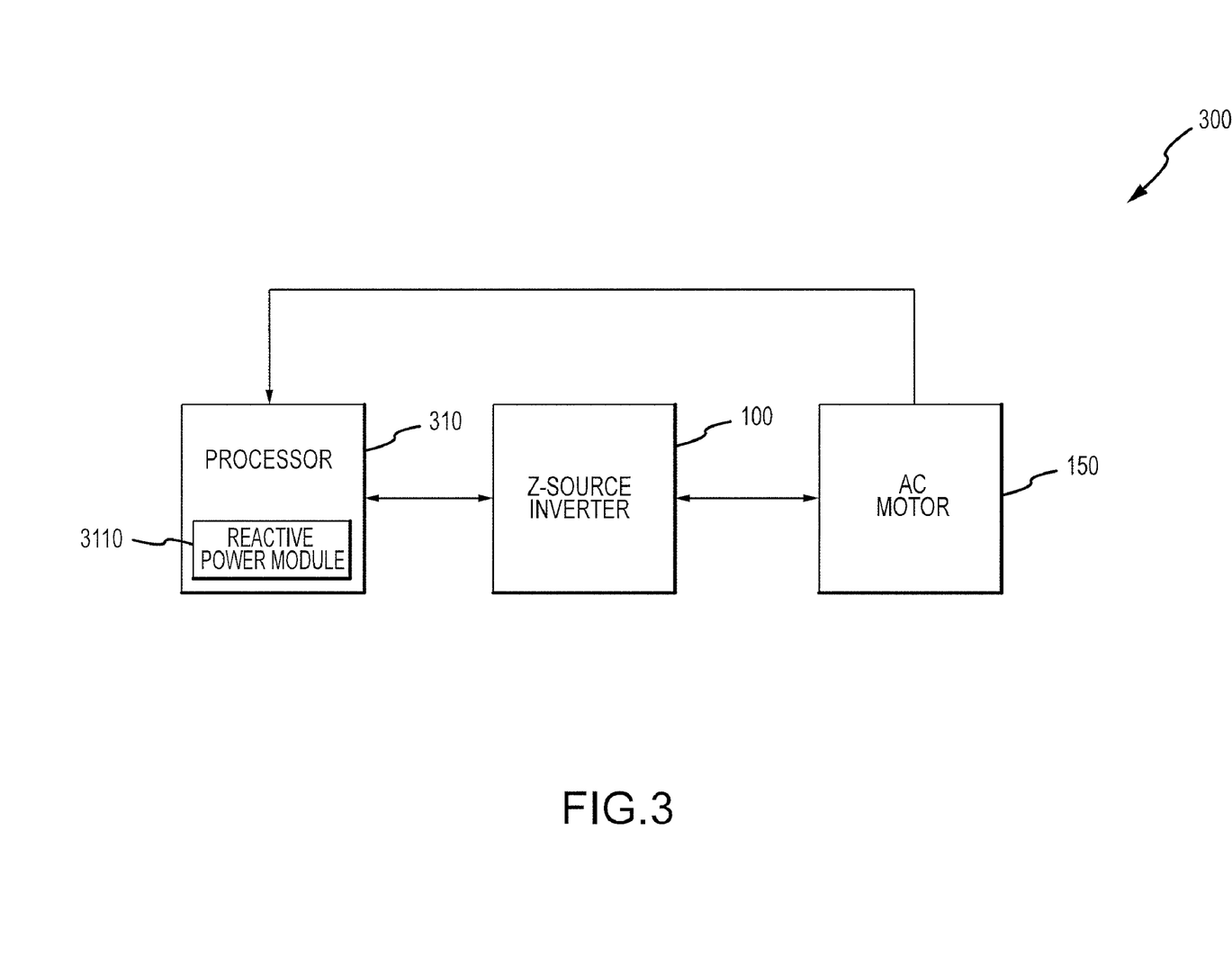
FIG. 3 is a block diagram of one exemplary embodiment of a system for operating inductors in a Z-source inverter in a continuous current mode.

FIG. 3 is a block diagram of one exemplary embodiment of a system 300 for operating inductors 1110 and 1150 of Z-source inverter 100 (see FIG. 1) in a continuous current mode. As illustrated in FIG. 3, system 300 comprises Z-source inverter 100 coupled to AC motor 150 similar to the discussion above with reference to FIG. 1. Furthermore, system 300 comprises a processor 310 coupled to Z-source inverter 100 and AC motor 150. Specifically, processor 310 is coupled to Z-source inverter 100 such that processor 310 is capable of receiving the current ($I_{inv}$) at the positive DC-link (e.g., node 1145) of Z-source inverter 100 and coupled to AC motor 150 such that processor 310 receives the motor speed ($\omega_r$) of AC motor 150.

Processor 310 may be any hardware, software, and/or device capable of controlling and/or altering the voltage commands provided to Z-source inverter 100, which in turn affects power $P_a$, $P_b$, and $P_c$ supplied to AC motor 150. In accordance with one exemplary embodiment of the invention, processor 310 comprises a reactive power module 3110 configured to alter the voltage commands $V_a^*$, $V_b^*$, and $V_c^*$ supplied to Z-source inverter 100 so that Z-source inverter 100 can induce AC motor 150 to draw additional reactive power from Z-source inverter 100 and/or increase the amount of reactive power supplied to AC motor 150.

Reactive power module 3110 is configured to compare the amount of current ($I_{inv}$) at the positive DC-link with a threshold current ($I_{min}$) amount to determine if Z-source inverter 100 is providing low power or zero power to AC motor 150. In accordance with one exemplary embodiment of the invention, the threshold current $I_{min}$ is the critical current for inductors 1110 and/or 1150, which depends on the size of inductor 1110 and/or 1150.

If current $I_{inv}$ is at or below the threshold current $I_{min}$, reactive power module 3110 is configured to alter the q-axis current command $I_q^*$ and the d-axis current command $I_d^*$ supplied to synchronous current regulator 220, which in turn alters the voltage command $V_d^*$ and voltage command $V_q^*$ supplied to DQ-to-3 converter 240. The altered voltage command $V_d^*$ and voltage command $V_q^*$ results in altered voltage commands $V_a^*$, $V_b^*$, and $V_c^*$ being supplied to inverter 100. The altered voltage commands $V_a$ $V_a^*$, $V_b^*$, and $V_c^*$ supplied to inverter 100 cause inverter 100 to induce AC motor 150 to draw more reactive power from inverter 100 and/or add reactive power to AC motor 150.

When reactive power is added to AC motor 150, the current $I_{inv}$ in the DC-link increases and is kept above current $I_{min}$. By controlling the reactive power flowing to AC motor 150, Z-source inverter 100 operates in a continuous current mode at light loads, and the voltage at the positive DC-link can be regulated.

If current $I_{inv}$ is above current $I_{min}$, reactive power module does not alter the q-axis current command $I_q^*$ and the d-axis current command $I_d^*$ supplied to inverter 100. That is, system 300 operates in a similar manner to inverter 100 discussed above with reference to FIGS. 1 and 2.

Figure 4:
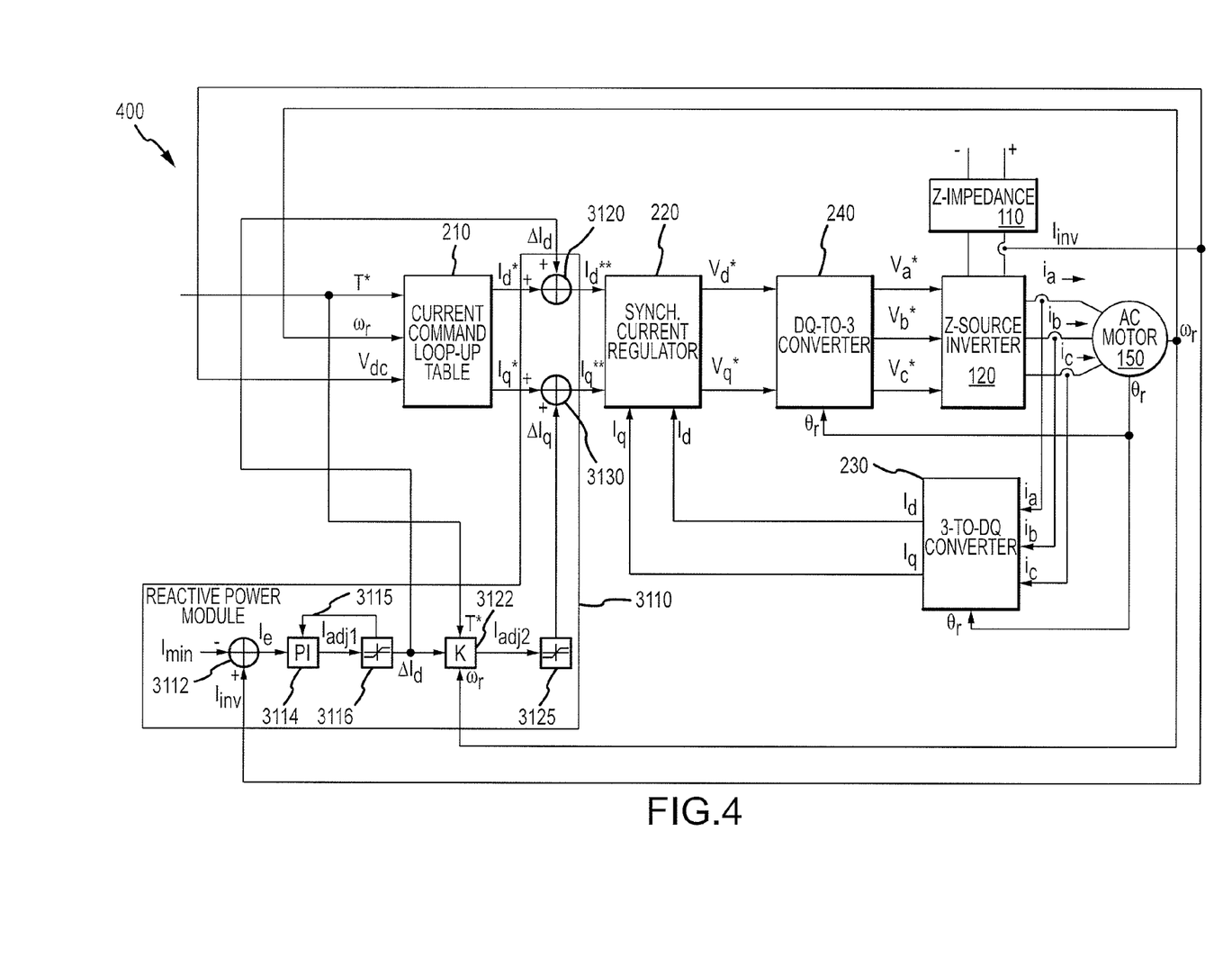
FIG. 4 is a diagram of an exemplary embodiment of a control system for the system of FIG. 3.

FIG. 4 is diagram of an exemplary embodiment of a control system 400 for system 300. Control system 400 comprises Z-impedance 110, inverter 120 (which form Z-source inverter 100), AC motor 150, current command look-up table 210, synchronous current regulator 220, 3-to-DQ converter 230, DQ-to-3 converter 240 similar to control system 200 discussed above with reference to FIG. 2. Control system 400 also comprises reactive power module 3110 (see FIG. 3) coupled to the output of current command look-up table 210 and the input of synchronous current regulator 220.

Reactive power module 3110 comprises a subtractor 3112 coupled to the positive DC-link of inverter 100 and is configured to subtract current $I_{inv}$ from current $I_{min}$ to create a difference current ($I_e$), which may represented by the equation ($I_{inv}-I_{min}$). As discussed above, current $I_{min}$ may be the critical current of inductor 1110 and/or 1150, or another pre-determined current amount.

Difference current $I_e$ is supplied to a proportion-integral (PI) controller 3114, and PI controller 3114 is configured to adjust difference current $I_e$ to form an adjusting current ($I_{adj1}$). Adjusting current $I_{adj1}$ is supplied to a limiter 3116, and limiter 3116 is configured to limit adjusting current $I_{adj1}$ within a pre-determined limit to generate a delta adjusting current in the d-axis ($\Delta I_d$). In accordance with one exemplary embodiment, delta adjusting d-axis current $\Delta I_d$ has a maximum value 0. That is, delta adjusting d-axis current $\Delta I_d$ is allowed to be between a negative value and zero.

Delta adjusting d-axis current $\Delta I_d$ is supplied back to PI controller 3114 via a feedback loop 3115 and supplied to an adder 3120. Adder 3120 is configured to add delta adjusting d-axis current $\Delta I_d$ to the d-axis current command $I_d^*$ to generate an altered current command ($I_d^{}$). When delta adjusting d-axis current $\Delta I_d$ is zero (i.e., $I_{inv}>I_{min}$), the operation of inverter 100 is similar to the discussion above with respect to control system 200 of FIG. 2 because altered current command $I_d^{}$ is equal to current command $I_d^*$ (i.e., $I_d^*+0=I_d^* \rightarrow I_d^{**}=I_d^*$). When delta adjusting d-axis current $\Delta I_d$ is negative (i.e., $I_{min}>I_{inv}$), altered current command $I_d^{**}$ will be less than current command $I_d^*$ (i.e., $I_d^{**}<I_d^*$). Altered current command $I_d^{}$ is then supplied to synchronous current regulator 220**.

Delta adjusting d-axis current $\Delta I_d$ is also supplied to a K multiplier 3122, and K multiplier 3122 also receives torque command $T^*$ and motor speed $\omega_r$ inputs from AC motor 150. K multiplier 3122 multiplies delta adjusting d-axis current $\Delta I_d$ by a K-factor to generate a second adjusting current ($I_{adj2}$). Adjusting current $I_{adj2}$ is supplied to a limiter 3125 to limit adjusting current $I_{adj2}$, which generates a delta adjusting q-axis current $\Delta I_q$. The limiter is used to make sure that delta adjusting q-axis current $\Delta I_q$ is within the operating range of inverter 100, which operating range depends on the size of the various components (e.g., inductors 1110, 1150 and capacitors 1120, 1130) used in system 300.

Delta adjusting q-axis current $\Delta I_q$ is supplied to an adder 3130, and adder 3130 is configured to add $\Delta I_q$ to current command $I_q^*$ to generate an altered current command ($I_q^{}$). Similar to altered current command $I_d^{}$, altered current command $I_q^{}$ is supplied to synchronous current regulator 220. The change in both altered current commands $I_d^{}$ and $I_q^{**}$ results in altered voltage commands $V_a^*$, $V_b^*$, and $V_c^*$ being supplied to Z-source inverter 100. The altered voltage commands $V_a^*$, $V_b^*$, and $V_c^*$ cause Z-source inverter 100 to induce AC motor 150 to draw a greater amount of reactive power from inverter 100 and/or to supply a greater amount of reactive power to AC motor 150. As discussed above, additional reactive power supplied and/or added to AC motor 150 induces AC motor 150 to regulate the voltage at the positive DC-link.

Figure 5:
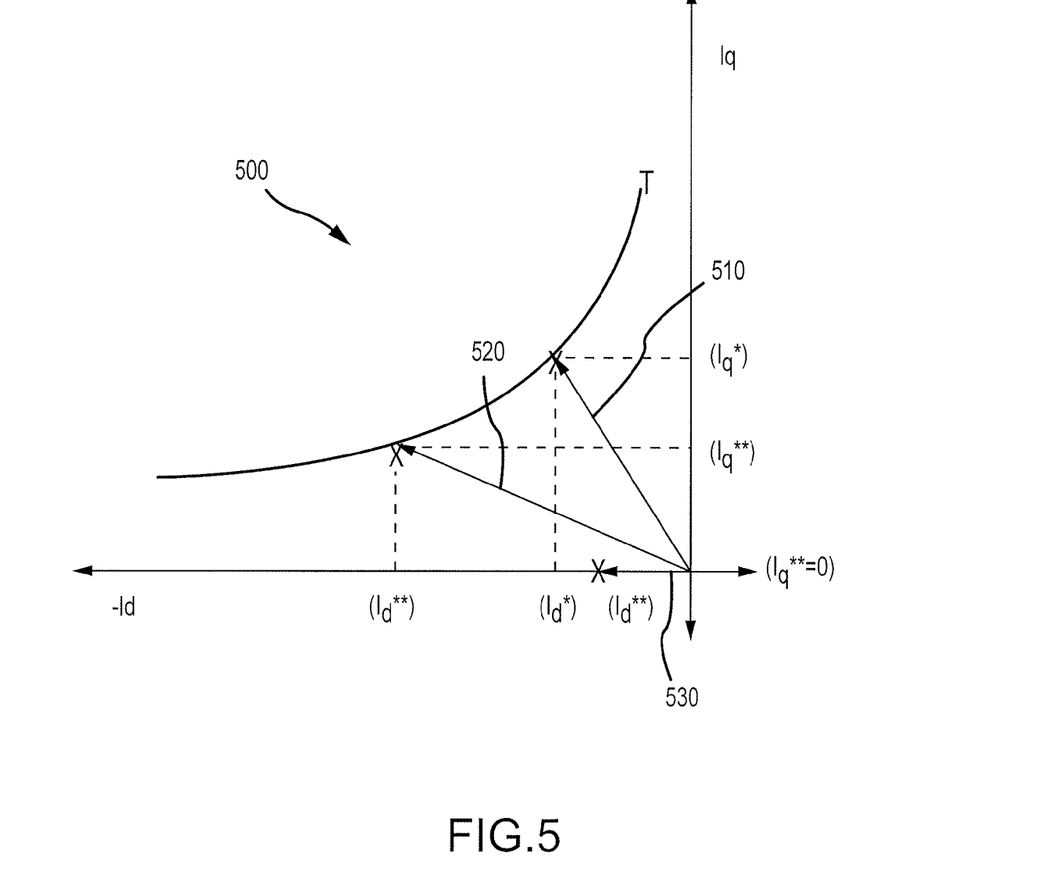
FIG. 5 is a graph illustrating a representation of the operation of the system of FIG. 3 compared to the operation of the Z-source inverter of FIG. 1.

FIG. 5 is a graph 500 illustrating at least one of the benefits of the present invention. Graph 500 includes a commanded torque line (T) and vectors 510, 520, and 530 shown with respect to current on the q-axis ($I_q$) and current on the d-axis ($-I_d$). Commanded torque line T represents the amount of torque AC motor 150 should be producing or the desired torque, which torque is controlled by the amount of power supplied to AC motor 150 by Z-source inverter 100.

Vector 510 points to a location on commanded torque line T representing the intersection of current commands $I_d^*$ and $I_q^*$. This location on commanded torque line T represents the operation of AC motor 150 without additional reactive power, or under the operating conditions discussed above with respect to FIGS. 1 and 2.

Vector 520 points to a location on commanded torque line T representing the intersection of current commands $I_d^{}$ and $I_q^{}$. This location on commanded torque line T represents the operation of AC motor 150 with additional reactive power as discussed above with reference to FIG. 4. AC motor 150 is induced to draw the additional reactive power because current commands $I_d^{}$ and $I_q^{}$ are smaller values than current commands $I_d^*$ and $I_q^*$. That is, current command $I_d^{**}$ is more negative than current command $I_d^*$, and current command $I_q^{**}$ is less positive than current command $I_q^*$. This decrease in current at the positive DC-link reduces the ability of capacitors 1120 and 1130 to store voltage, and represents inductors 1110 and 1150 operating in continuous mode.

Vector 530 represents the situation where current command $I_q^{}$ is equal to zero and $I_d^{}$ is less than zero (which may be any negative value). Vector 530 points to a location on the $-I_d$ axis and represents AC motor 150 at rest or zero torque output. Producing zero $I_q^{}$ when AC motor 150 is at rest also reduces the amount of current at the positive DC-link, which likewise, reduces the ability of capacitors 1120 and 1130 to store voltage, and also represents inductors 1110 and 1150** operating in continuous current mode.

Figure 6:
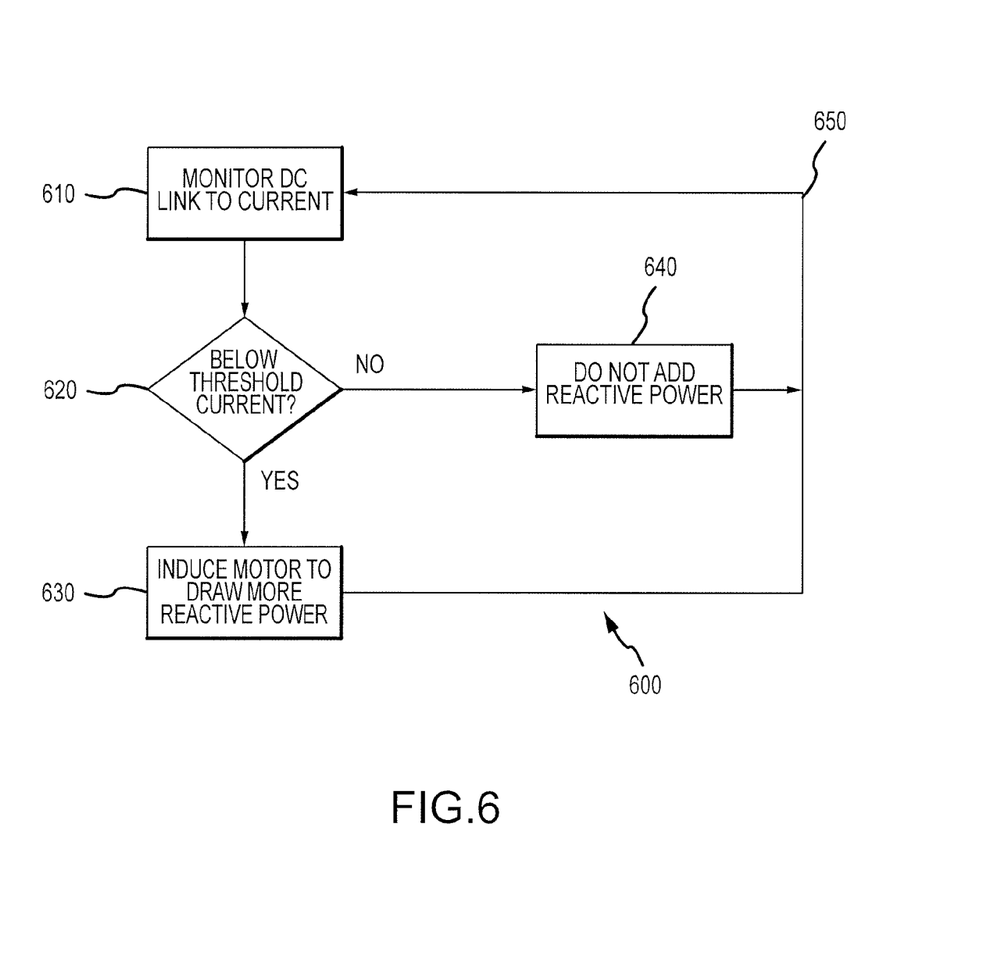
FIG. 6 is a flow diagram of a method for operating inductors in a Z-source inverter in a continuous current mode.

FIG. 6 is a flow diagram of a method 600 for operating inductors (e.g., inductors 1110 and 1150) in a Z-source inverter (e.g., Z-source inverter 100) in a continuous current mode. Method 600 begins by monitoring the current (e.g., $I_{inv}$) at the DC-link (e.g., node 1145) (step 610) to determine if current $I_{inv}$ is at or below a threshold current $I_{min}$ (step 620). In one embodiment, step 620 comprises the step of determining if the plurality of inductors are providing the same amount or less current to the inverter than a critical current of the plurality of inductors.

If current $I_{inv}$ is at or below the threshold current, an AC motor (e.g., AC motor 150) coupled to Z-source inverter 100 is induced to draw more reactive power (step 630). In one exemplary embodiment, AC motor 150 is induced to draw more reactive power by changing the d-axis and q-axis current commands (i.e., changing $I_d^*$ and $I_q^*$ to $I_d^{}$ and $I_q^{}$, respectively). In another embodiment, inducing AC motor 150 to draw more reactive power comprises controlling the current provided to AC motor 150 so that reactive power is added to AC motor 150 by Z-source inverter 100.

Inducing AC motor 150 to draw more reactive power, in another embodiment, includes altering a synchronous current provided to a current regulator (e.g., synchronous current regulator 220) providing voltage to the inverter (via, for example, DQ-to-3 converter 240). In accordance with one embodiment where the synchronous current includes a d-axis current command ($I_d^*$) and a q-axis current command ($I_q^*$), the altering step comprises adding a delta adjusting d-axis current ($\Delta I_d$) to the d-axis current command $I_d^*$ to form an altered d-axis current command ($I_d^{**}$), and adding a delta adjusting q-axis current ($\Delta I_q$) to the q-axis current command ($I_q^*$) to form an altered q-axis current command ($I_q^{**}$).

If the DC-link current is above the threshold current, additional reactive power is not added to AC motor 150 and/or AC motor 150 is not induced to draw additional reactive power from Z-source inverter 100 (step 640). That is, the operation of the Z-source inverter is not altered or operates similar to Z-source inverter 100 discussed above with reference to FIGS. 1 and 2. Furthermore, after step 640 and/or step 630, current $I_{inv}$ is continued to be monitored (step 650).

Figure 7:
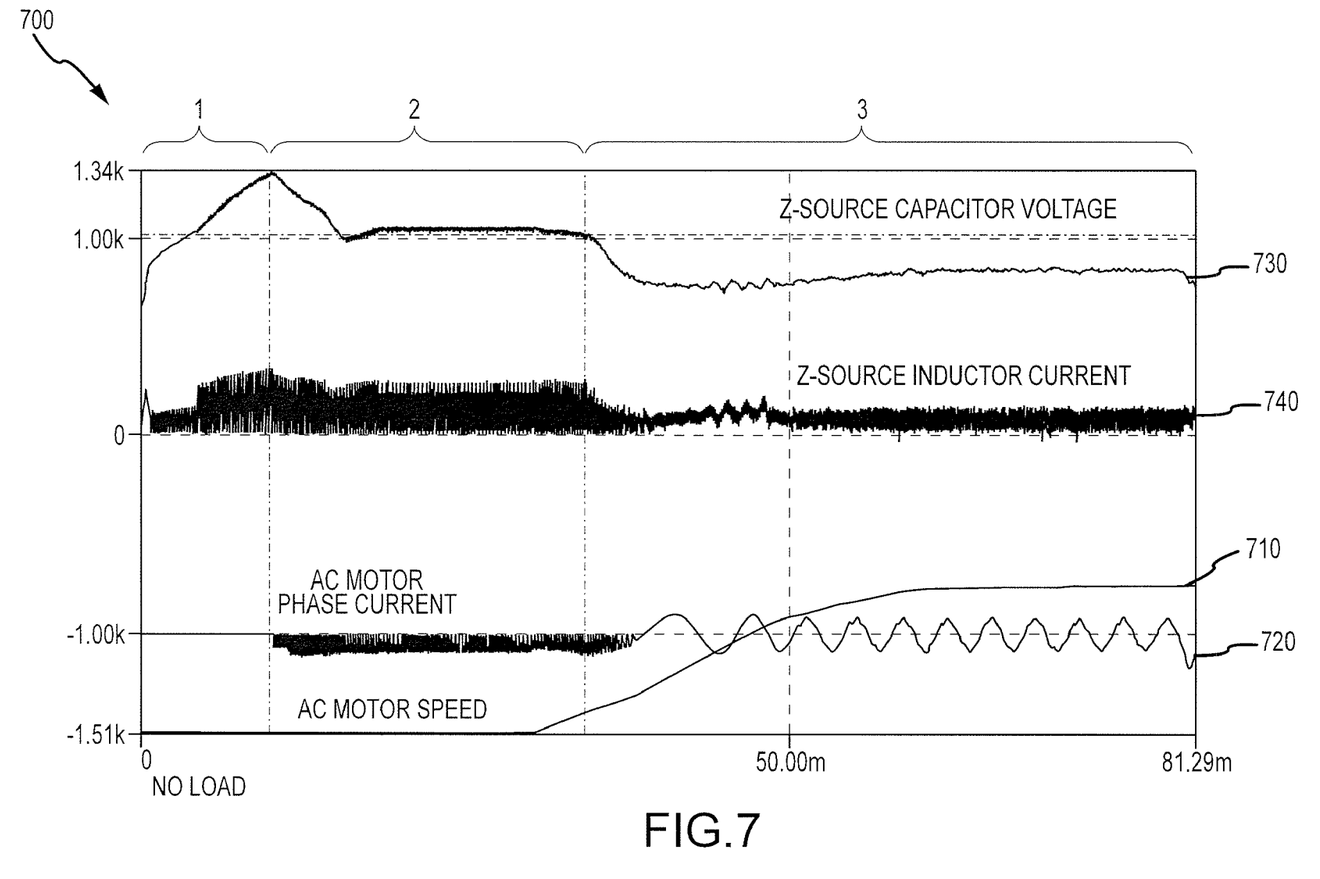
FIG. 7 is a graph illustrating at least one of the benefits of the systems of FIG. 3.

FIG. 7 is a graph 700 illustrating at least one of the benefits of system 300. Graph 700 is divided in three sections (1, 2, and 3) illustrating the characteristics of system 300 under various operating conditions.

In section 1, AC motor 150 has zero speed (i.e., is at rest) as represented by line 710, and does not demand current from the positive DC-link (e.g., node 1145) as represented by line 720. As illustrated, the voltage, represented by line 730, of capacitors 1120 and 1130 increases indicating that inductors 1110 and 1150 are unstable (i.e., are operating in a discontinuous current mode), as represented by line 740.

Section 2 illustrates the conditions when reactive power (i.e., $\Delta I_d$ is negative and $\Delta I_q$ is zero) is added to AC motor 150 (i.e., AC motor is induced to draw reactive power), as indicated by line 720, while AC motor 150 remains at rest. The result of adding reactive power to AC motor 150 is that the voltage of capacitors 1120 and 1130 begins to decrease and inductors 1110 and 1150 begin operating in a continuous current mode.

In section 3, a large amount of torque is applied to AC motor 150, which applies active and reactive power to AC motor 150. The voltage of capacitors 1120 and 1130 continues to decrease, but is stable, indicating that inductors 1120 and 1130 are operating in continuous current mode. Furthermore, the motor speed increases and the phase current becomes sinusoidal. Moreover, the voltage of capacitors 1120 and 1130 can be maintained, increased, or decreased by controlling the amount of reactive power provided to AC motor 150.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A motor control system, comprising:
    an alternating current (AC) motor;
    an inverter coupled to the AC motor, the inverter having a DC-link and being configured to provide current and a first amount of reactive power to the AC motor to produce a commanded torque in the AC motor; and
    a processor coupled to the AC motor and the inverter, the processor configured to:
        monitor a current at the DC-link; and
        instruct the inverter to provide a second amount of reactive power to the AC motor to produce the commanded torque in the AC motor if the current at the DC-link of the inverter is one of below and equal to a threshold current amount, the second amount of reactive power being greater than the first amount of reactive power.

2. The system of claim 1, further comprising a reactive power module coupled to the inverter, the reactive power module configured to alter a first synchronous current command configured to produce the commanded torque to form a second synchronous current command supplied to the inverter to induce the inverter to provide the second amount of reactive power, wherein the second synchronous current command is configured to produce the commanded torque.

3. The system of claim 2, further comprising a look-up table coupled to the AC motor, the look-up table configured to select the first synchronous current command based on a torque command, a motor speed of the AC motor, and a DC-link voltage.

4. The system of claim 3, further comprising a first adder coupled to the look-up table and the reactive power module, wherein:
    the first synchronous current command includes a d-axis current command obtained from the look-up table;
    the first adder is configured to add the d-axis current command to a delta-adjusting d-axis current received from the reactive power module to form an altered d-axis current of the second synchronous current command; and
    the delta-adjusting d-axis current command is based on a difference between the current at the DC-link and the threshold current amount.

5. The system of claim 4, further comprising a second adder coupled to the look-up table and the reactive power module, wherein:
    the first synchronous current command includes a q-axis current command obtained from the look-up table;
    the second adder is configured to add the q-axis current command to a delta-adjusting q-axis current received from the reactive power module to form an altered q-axis current of the second synchronous current command; and
    the delta-adjusting q-axis current command is based on the delta-adjusting d-axis current and the torque value.

6. The system of claim 1, wherein the inverter is a Z-source inverter.

7. The system of claim 1, wherein:
    the processor is configured to instruct the inverter to provide the current and the first amount of reactive power to the AC motor in response to a commanded torque, the current provided to the AC motor being configured to produce the commanded torque in the AC motor; and
    the second amount of reactive power is configured to produce the commanded torque in the AC motor.

8. A method for operating a plurality of inductors in a Z-source inverter providing current to an alternating current (AC) motor in a continuous current mode, the plurality of inductors being coupled to a DC-link, the method comprising the steps of:
    operating the Z-source inverter to produce a commanded torque in the AC motor;
    determining if a current at the DC-link is one of below and equal to a threshold current amount; and
    inducing the AC motor to draw more reactive power to produce the commanded torque if the current at the DC-link is one of below and equal to the threshold current amount.

9. The method of claim 8, wherein the inducing step comprises the step of adding reactive power to the AC motor.

10. The method of claim 9, wherein the adding reactive power step comprises the step of controlling the current provided to the AC motor so that the AC motor is induced to draw additional reactive power.

11. The method of claim 8, wherein the inducing step comprises the step of altering synchronous currents provided to a current regulator providing voltage commands to the inverter.

12. The method of claim 8, wherein the determining step comprises the step of determining if the plurality of inductors are providing one of the same amount and less current to the inverter than a critical current of the plurality of inductors.

13. The method of claim 8, further comprising determining synchronous frame current commands configured to produce the commanded torque in the AC motor, wherein:
- operating the Z-source inverter comprises operating the Z-source inverter based on the synchronous frame current commands; and
- inducing the AC motor to draw more reactive power comprises altering the synchronous frame current commands to provide more reactive power to the AC motor while producing the commanded torque.

14. The method of claim 13, wherein:
- the synchronous frame current commands include a d-axis current command and a q-axis current command; and
- altering the synchronous frame current commands comprises:
  - determining a delta-adjusting d-axis current based on a difference between the current at the DC-link and the threshold current amount;
  - adding the delta-adjusting d-axis current to the d-axis current command;
  - determining a delta-adjusting q-axis current based on the commanded torque and the delta-adjusting d-axis current; and
  - adding the delta-adjusting q-axis current to the q-axis current command.

15. A reactive power module for operating a plurality of inductors in an inverter coupled to an alternating current (AC) motor in a continuous current mode, comprising:
- means for determining if a current at a DC-link coupled to the inverter is one of at and below a threshold current amount; and
- means for altering a first d-axis current command and a first q-axis current command of a synchronous current command configured to produce a commanded torque in the AC motor to form an altered synchronous current command provided to the inverter to induce the AC motor to draw more reactive power from the inverter, wherein the altered synchronous current command is configured to produce the commanded torque.

16. The reactive power module of claim 15, wherein the determining means comprises means for subtracting a critical current for the plurality of inductors from the current at the DC-link.

17. The reactive power module of claim 15, wherein the altering means comprises:
- means for determining a delta-adjusting q-axis current based on the commanded torque; and
- means for adding the delta-adjusting q-axis current to the first q-axis current command to produce a q-axis current of the altered synchronous current command.

18. The reactive power module of claim 17, wherein the altering means further comprises:
- means for determining a delta-adjusting d-axis current based on a difference between the current at the DC-link and the threshold current amount, wherein the delta-adjusting q-axis current is determined based on the delta-adjusting d-axis current; and
- means for adding the delta-adjusting d-axis current to the first d-axis current command to produce a d-axis current of the altered synchronous current.

19. The reactive power module of claim 18, further comprising means for limiting the delta-adjusting q-axis current and the delta-adjusting d-axis current to respective maximum and minimum values.

* * * * *